(12) United States Patent
Chen et al.

(10) Patent No.: US 9,891,770 B2
(45) Date of Patent: Feb. 13, 2018

(54) METHODS FOR FORMING A PATTERNED STRUCTURE IN A SENSOR

(71) Applicant: Apple Inc., Cupertino, CA (US)

(72) Inventors: Po-Jui Chen, Taipei (TW); Soyoung Kim, Cupertino, CA (US); Kuo-Hua Sung, Cupertino, CA (US); Hui Chen, Cupertino, CA (US); Rui Qiao, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 322 days.

(21) Appl. No.: 14/839,572

(22) Filed: Aug. 28, 2015

(65) Prior Publication Data

US 2017/0060292 A1 Mar. 2, 2017

(51) Int. Cl.
*G06F 3/00* (2006.01)
*G06F 3/044* (2006.01)

(52) U.S. Cl.
CPC .... *G06F 3/044* (2013.01); *G06F 2203/04103* (2013.01); *G06F 2203/04111* (2013.01)

(58) Field of Classification Search
CPC ...................................................... G06F 3/004
See application file for complete search history.

(56) References Cited

U.S. PATENT DOCUMENTS

| 7,152,482 | B2 | 12/2006 | Ueno et al. |
| 8,305,358 | B2 | 11/2012 | Klinghult |
| 8,421,483 | B2 | 4/2013 | Klinghult |
| 8,547,495 | B2 | 10/2013 | Lee |
| 8,553,004 | B2 | 10/2013 | Hotelling et al. |
| 8,560,947 | B2 | 10/2013 | Gillespie et al. |
| 8,618,720 | B2 | 12/2013 | Paleczny et al. |
| 8,730,199 | B2 | 5/2014 | Sleeman et al. |
| 8,743,060 | B2 | 6/2014 | Hotelling |
| 8,878,811 | B1 | 11/2014 | Baumbach |
| 8,970,507 | B2 | 3/2015 | Holbein et al. |
| 8,988,384 | B2 | 3/2015 | Krah et al. |
| 9,081,453 | B2 | 7/2015 | Bulea et al. |
| 9,116,570 | B2 | 8/2015 | Lee et al. |
| 9,348,472 | B2 | 5/2016 | Kang |
| 9,690,408 | B1 | 6/2017 | Krah |
| 9,779,676 | B2 | 10/2017 | Al-Dahle et al. |
| 2008/0284925 | A1* | 11/2008 | Han ..................... G06F 3/0425 349/12 |
| 2009/0002199 | A1 | 1/2009 | Lainonen et al. |

(Continued)

FOREIGN PATENT DOCUMENTS

WO WO 15/077200 5/2015

OTHER PUBLICATIONS

Min et al., "Adaptive Touch Sampling for Energy-Efficient Mobile Platforms," Intel Corporation, Hillsboro, OR 97124, 4 pages.

(Continued)

*Primary Examiner* — Daniel McNally
(74) *Attorney, Agent, or Firm* — Brownstein Hyatt Farber Schreck, LLP

(57) ABSTRACT

A sensor includes a patterned compliant layer positioned between two substrates. Each substrate can include one or more conductive electrodes, with each electrode of one substrate paired with a respective electrode of the other substrate. Each pair of conductive electrodes forms a capacitor. Several methods are disclosed that can be used to produce the patterned compliant layer.

15 Claims, 12 Drawing Sheets

(56) References Cited

U.S. PATENT DOCUMENTS

| | | |
|---|---|---|
| 2009/0326833 A1 | 12/2009 | Ryhanen et al. |
| 2012/0086666 A1 | 4/2012 | Badaye et al. |
| 2013/0082970 A1 | 4/2013 | Frey et al. |
| 2015/0084909 A1 | 3/2015 | Worfolk et al. |
| 2015/0103038 A1 | 4/2015 | Han et al. |
| 2015/0339001 A1 | 11/2015 | Zirkl et al. |
| 2016/0062497 A1 | 3/2016 | Huppi et al. |
| 2017/0285810 A1 | 10/2017 | Krah |

OTHER PUBLICATIONS

Bau, et al., "TeslaTouch: Electrovibration for Touch Surfaces," UIST'10, Oct. 3-6, 2010, New York, New York USA, 10 pages.
Feist, "Samsung snags patent for new pressure sensitive touchscreens," posted on AndroidAuthority.com at URL: http://www.androidauthority.com/samsung-patent-pressure-sensitive-touch-screens-354860, Mar. 7, 2014, 1 page.

\* cited by examiner

METHODS FOR FORMING A PATTERNED STRUCTURE IN A SENSOR

FIELD

The described embodiments relate generally to sensors in electronic devices. More particularly, the present embodiments relate to methods for forming a patterned structure in a sensor.

BACKGROUND

Electronic devices include many different electrical, mechanical, and structural components. One example of an electrical component is a sensor, such as a capacitive sensor that can be used to detect a touch or force input applied to a surface of the electronic device. A capacitive sensor typically includes two conductive plates, or electrodes, separated by a gap. In some instances, it is desirable to reduce the thickness or height of the sensor in the z-direction. For example, it can be beneficial to produce a sensor with a reduced height when the sensor is to be positioned in location that has limited space. Additionally or alternatively, the construction of the sensor should permit efficient manufacturing and mass production.

SUMMARY

A sensor includes a patterned compliant layer positioned between two substrates. Each substrate can include one or more conductive electrodes, with each electrode in or on one substrate paired with a respective electrode on or in the other substrate. Each pair of conductive electrodes forms a capacitor. In one embodiment, the first and second substrates are flexible circuits and the compliant material is a liquid silicone. Several methods disclosed herein can be used to produce the patterned compliant layer.

In one aspect, a method of forming a sensor that includes a patterned compliant layer includes disposing a compliant material over a surface of a first substrate layer. One or more compliant material-phobic elements are arranged in a pattern over the surface of the first substrate. A second substrate may then be positioned over the compliant layer and a downward force applied to the second substrate to wet the compliant material to the areas on the surface of the first substrate layer that do not include the compliant material-phobic elements. Wetting the compliant material to select areas on the surface of the first substrate produces a patterned compliant material between the first and second substrate layers. The patterned compliant material may then be cured to produce a patterned compliant layer between the first and second substrate layers.

In another aspect, a method of forming a sensor that includes a patterned compliant layer includes disposing a compliant material over a surface of a first substrate layer, where the surface of the first substrate layer includes one or more discrete electro-active elements. A signal is applied to the one or more electro-active elements to produce a wettability contrast on the surface of the first substrate and pattern the compliant material. For example, in one embodiment the wettability contrast causes the compliant material to dewet from the surface(s) of the one or more electro-active elements and form droplets in the surface areas that do not include the electro-active element(s). In another embodiment, the wettability contrast causes the compliant material to wet to the surface(s) of the one or more electro-active elements and form droplets over the electro-active element(s). The patterned compliant material may then be cured (e.g., thermal curing) to produce a patterned compliant layer. The second substrate can be positioned over the patterned compliant layer.

In yet another aspect, a method of forming a sensor that includes a patterned compliant layer includes disposing an ultraviolet (UV) curable compliant material over a surface of the first substrate layer. A pattern is formed in the UV curable compliant material to produce a patterned compliant layer. A second substrate layer can then be positioned over the patterned compliant layer. In one embodiment, the pattern is formed in the UV curable compliant layer by positioning a mask over the UV curable compliant material. The mask includes one or more openings that are arranged in a pattern. The UV curable compliant material can then be cured by emitting a UV light towards the mask. The non-cured portions of the cured UV curable compliant material are then removed to produce the patterned compliant layer.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to a sensor or sensors that can be included in an electronic device. The sensor includes a patterned compliant layer positioned between two substrates. In one embodiment, the sensor is a capacitive sensor that can be used to detect touch and/or force inputs that are applied to a surface of an electronic device. Each substrate can be a flexible circuit that includes one or more conductive electrodes. The patterned compliant layer can provide a higher degree of compressibility to the sensor because the compliant material that forms the compliant layer can squeeze into the open areas (areas without compliant material) when a force is applied to the sensor. Additionally, in some embodiments the patterned compliant layer is a dielectric for each capacitor formed by one or more pairs of conductive electrodes in the first and second substrates.

These and other embodiments are discussed below with reference to FIGS. 1-14. However, those skilled in the art will readily appreciate that the detailed description given herein with respect to these Figures is for explanatory purposes only and should not be construed as limiting.

Directional terminology, such as "top", "bottom", "front", "back", "leading", "trailing", etc., is used with reference to the orientation of the Figure(s) being described. Because components of embodiments described herein can be positioned in a number of different orientations, the directional terminology is used for purposes of illustration only and is in no way limiting. When used in conjunction with the layers of a structure or component that is included in an electronic device, the directional terminology is intended to be construed broadly, and therefore should not be interpreted to preclude the presence of one or more intervening layers or other intervening features or elements. Thus, a given layer that is described as being formed, positioned, disposed on or over another layer, or that is described as being formed, positioned, disposed below or under another layer may be separated from the latter layer by one or more additional layers or elements.

Figure 1:
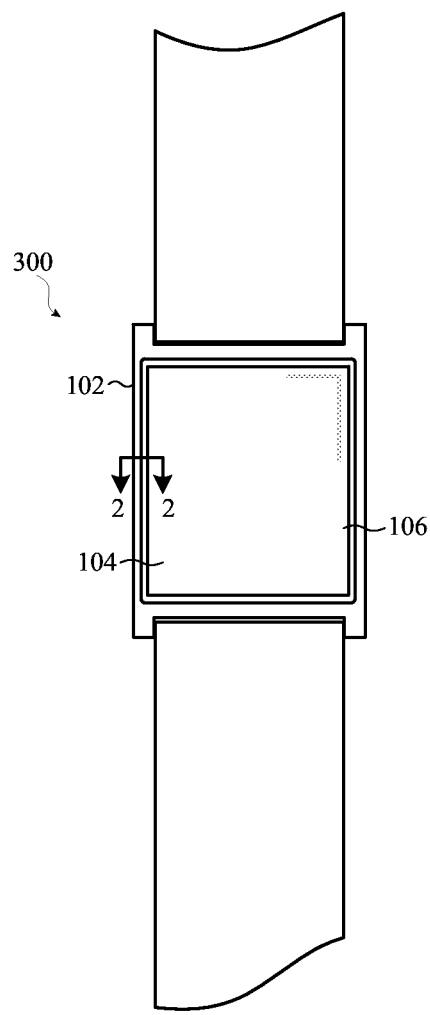
FIG. 1 shows a plan view of one example of an electronic device that can include a sensor.

FIG. 1 illustrates a plan view of one example of an electronic device that can include a sensor. The illustrated electronic device 100 is depicted as a wearable electronic device that may provide information regarding time, health, fitness, wellness, video, messages, operating commands, and statuses of externally connected or communicating devices and/or software executing on such devices (and may receive any of the foregoing from an external device). Other embodiments are not limited to a wearable electronic device. For example, an electronic device can be a tablet computing device, a digital music player, a gaming device, a smart telephone, a laptop computer, a remote control, and any other suitable electronic device.

An enclosure 102 can form an outer surface or partial outer surface for the internal components of the electronic device 100. The enclosure 102 at least partially surrounds a display 104 and one or more input/output devices (not shown). The enclosure 102 can be formed of one or more components operably connected together, such as a front piece and a back piece. Alternatively, the enclosure 102 can be formed of a single piece operably connected to the display 104. The enclosure 102 can be formed of any suitable material, including, but not limited to, plastic and metal. In the illustrated embodiment, the enclosure 102 is formed into a substantially rectangular shape, although this configuration is not required.

The display 104 can provide a visual output to the user. The display 104 can be implemented with any suitable technology, including, but not limited to, a multi-touch sensing touchscreen that uses liquid crystal display (LCD) technology, light emitting diode (LED) technology, organic light-emitting display (OLED) technology, organic electroluminescence (OEL) technology, or another type of display technology. In some embodiments, the display 104 can function as an input device that allows the user to interact with the electronic device 100. For example, the display can include a touch sensing device that allows the display to function as a multi-touch display.

In some embodiments, a cover glass 106 can be disposed over a top surface of the display 104 and the electronic device 100. The cover glass can be a transparent cover glass when the cover glass is disposed over the display (or the portion of the cover glass overlying the display may be transparent). The cover glass 106 may be made of any suitable material, such as glass, plastic, or sapphire.

Figure 2:
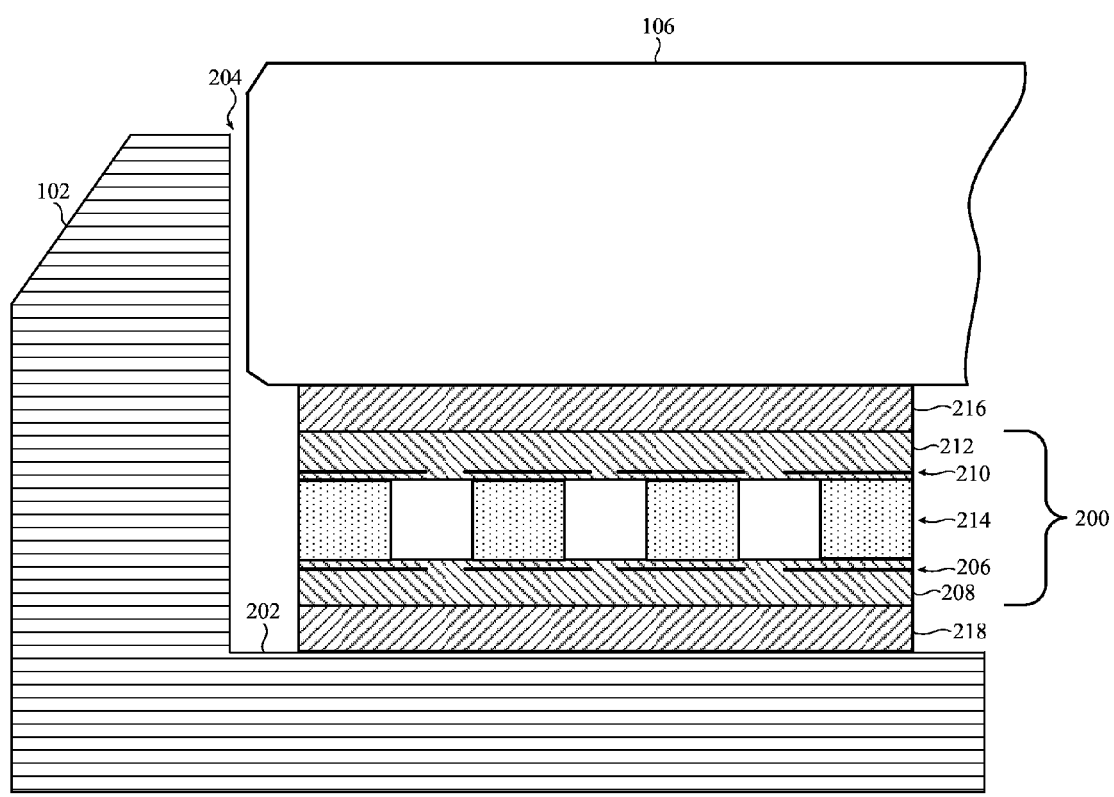
FIG. 2 shows a cross-sectional view of the electronic device taken along line 2-2 in FIG. 1.

In some embodiments, the electronic device can include one or more sensors that is positioned within the electronic device or around an internal periphery of the electronic device. For example, a proximity sensor, a motion sensor, a touch sensor, and/or a force sensor may be included in the electronic device. FIG. 2 shows a cross-sectional view of the electronic device taken along line 2-2 in FIG. 1. In the illustrated embodiment, a force sensor 200 is positioned between the enclosure 102 and the cover glass 106. In particular, the force sensor 200 rests on a ledge 202 of the enclosure 102. The ledge 202 extends into the interior of the electronic device. In some embodiments, the ledge 202 can be integrally formed as part of the enclosure 102. Alternatively, in other embodiments the ledge 202 is connected or affixed to the enclosure 102 using any suitable attachment mechanism. For example, the ledge 202 can be affixed to the enclosure 102 using an adhesive, one or more mechanical attachments such as a screw, or by welding the ledge 202 to the enclosure 102.

In the illustrated embodiment, the enclosure includes an opening 204 that corresponds to the shape of the cover glass 106. The cover glass 106 is disposed in the opening 204. As shown in FIG. 2, a top surface of the cover glass 106 can extend beyond the top surface of the enclosure 102. In other embodiments, the top surface of the cover glass 106 may be co-planar with or below the top surface of the enclosure 102. In some embodiments, the force sensor 200 can seal the space or the junction between the top surface of the ledge 202 and the bottom surface of the cover glass 106. In one embodiment, the force sensor 200 is a continuous sensor that extends completely around the internal periphery of the electronic device 100. In another embodiment, the force sensor 200 can be one or more discrete sensors that are disposed at select locations around the internal perimeter of the electronic device 100.

The force sensor 200 can include any suitable circuitry or components that support the operations and functionality of the sensor. In a non-limiting example, a first set of conductive electrodes 206 can be formed over (e.g., included in or on) a surface of a first substrate layer 208 and a second set of conductive electrodes 210 can be formed over a surface of a second substrate layer 212. In one non-limiting example, the first and second substrate layers 208, 212 can each be a flexible printed circuit. Different types of substrate layers can be used in other embodiments.

The first and second sets of conductive electrodes 206, 210 can each include one or more conductive electrodes. Each conductive electrode in the first set of conductive electrodes 206 is paired with a respective conductive electrode in the second set of conductive electrodes 210. Each pair of conductive electrodes forms a capacitor. The force sensor 200 is configured to produce capacitance changes based on a force applied to the cover glass 106. The capacitance of one or more capacitors in the force sensor may vary when a user applies a force to the cover glass 106. A processing device (not shown) operably connected to the force sensor 200 can be configured to correlate the changes in capacitance to an amount of force (or a change in force).

The user can apply the force to the cover glass 106 with a body part (e.g., a finger) or with a device, such as a stylus.

A patterned compliant layer 214 is disposed between the first and second substrate layers 208, 212. The patterned compliant layer 214 can be formed with any suitable material. As one example, the patterned compliant layer 214 is made of a polymer material, such as silicone, but other embodiments are not limited to this configuration. The compliant layer 214 is configured to provide elastic deformation to the sensor 200 based on a touch and/or a force applied to the cover glass 106. Patterning the compliant layer 214 can provide a higher degree of compressibility because the compliant material that forms the compliant layer 214 can squeeze into the open areas (areas without compliant material) when a force is applied to the sensor. Additionally, in the illustrated embodiment the patterned compliant layer 214 is a dielectric for the one or more capacitors that are formed by the pairs of conductive electrodes in the first and second sets of conductive electrodes 206, 210. Techniques for producing the patterned compliant layer are described in more detail in conjunction with FIGS. 7-14.

The force sensor 200 is attached to the cover glass 106 and to the enclosure 102 through adhesive layers 216, 218, respectively. The first adhesive layer 216 is positioned between the second substrate layer 212 and the bottom surface of the cover glass 106. The second adhesive layer 218 is positioned between the first substrate layer 208 and the top surface of the ledge 202. Any suitable adhesive material can be used in the adhesive layers 216, 218. In one embodiment, the first and second adhesive layers 216, 218 are pressure sensitive adhesive layers.

In other embodiments, the force sensor (as well as any other suitable sensor) can be constructed with different circuitry and/or components. As one example, a force sensor can be implemented as an optical force sensor, a strain gauge, or an ultrasonic force sensor.

Figure 3:
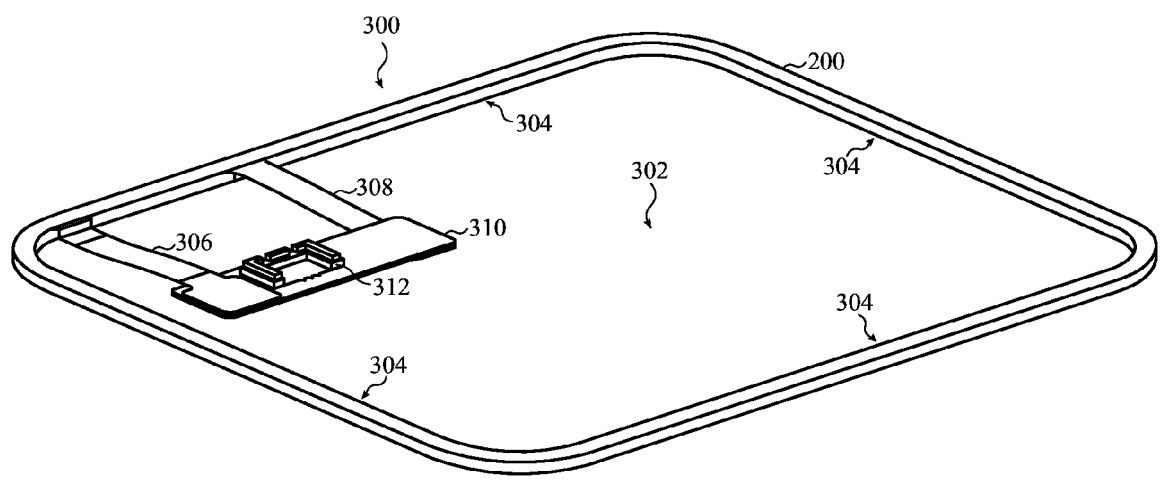
FIG. 3 shows one example of a sensor module.

FIG. 3 shows one example of a sensor module. The sensor module 300 includes the sensor 200 configured a continuous force sensor that extends completely around the internal periphery of the electronic device 100. An opening 302 is formed in between the inside edges 304 of the sensor 200. The first substrate layer 208 (not shown) and the second substrate layer 212 (not shown) extend away from an inside edge 304 of the sensor 200 and into the opening 302 to form first and second substrate tails 306, 308, respectively. When the first and second substrate layers 208, 210 are flexible printed circuits, the first and second substrate tails 306, 308 are flexible circuit tails. The ends of the first and second substrate tails 306, 308 connect to an interposer flexible circuit 310. Although not limited to this construction, the first substrate tail 306 can connect to a top surface of the interposer flexible circuit 310 and the second substrate tail 300 may connect to a bottom surface of the interposer flexible circuit 310. A connector 312, such as a board-to-board connector is connected to the interposer flexible circuit 310.

In one embodiment, the second substrate tail 308 is used as a drive tail that is configured to transmit drive signals to the first set of conductive electrodes 206. The first substrate tail 306 is used to as a sense tail that is configured to receive sense signals from the second set of conductive electrodes 210. The connector 312 electrically connects the sensor 200 (through first and second substrate tails 306, 308) to another circuit or component in the electronic device, such as a processing device (not shown). The processing device is configured to receive the sense signals and correlate the changes in capacitance (represented by the sense signals) to an amount of force.

Figure 4:
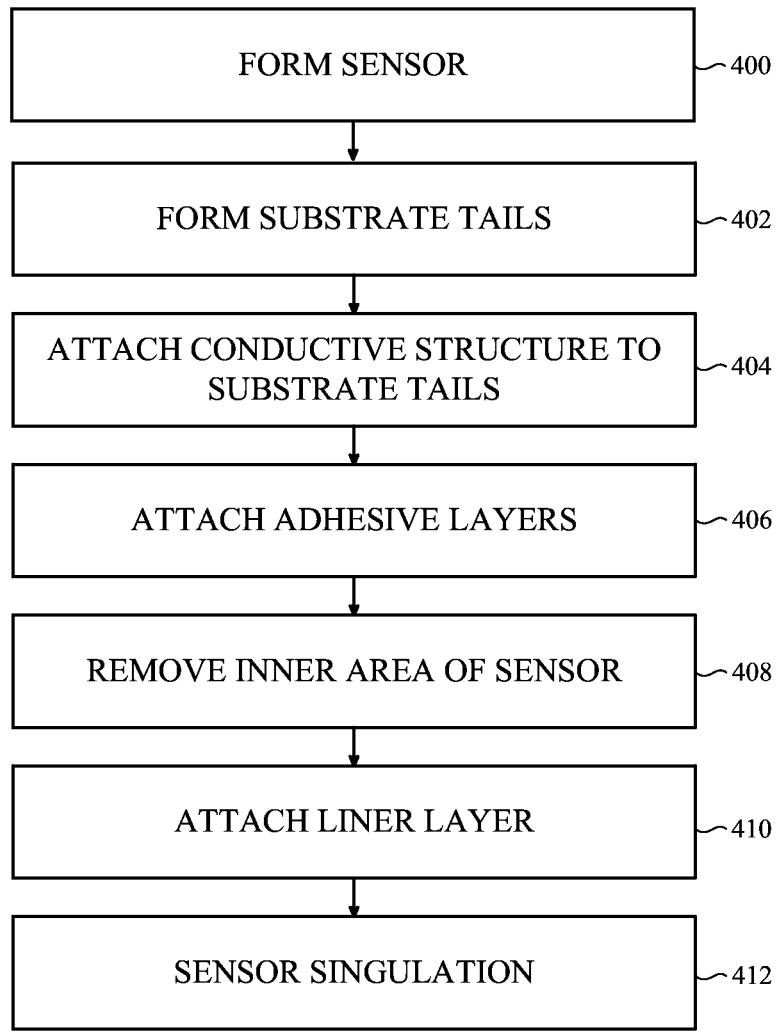
FIG. 4 shows a flowchart of an example method that can be used to produce a sensor module.
Figure 5:
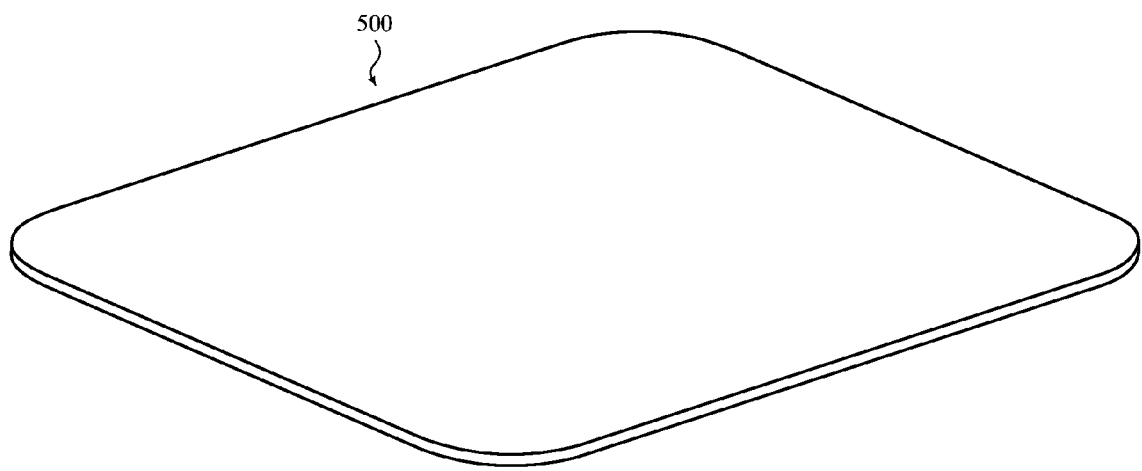
FIG. 5 shows one example of a sheet of a sensor structure.

FIG. 4 shows a flowchart of an example method that can be used to produce a sensor module. Initially, a sensor structure is formed (e.g., sensor 200 in FIG. 2). When formed, the sensor structure is an uninterrupted structure (e.g., a sheet) that includes multiple layers, such as the layers of the force sensor 200 shown in FIG. 2. FIG. 5 illustrates one example of a sheet of a sensor structure. The sheet of the sensor structure 500 will be cut or singulated into individual sensor modules at a later time in the process. Although the sensor structure 500 is shown in a rectangular-like shape, in other embodiments the sensor structure 500 can have any given shape and/or dimensions.

Next, as shown in block 402, the substrate tails are produced by removing the layers above or below each substrate tail. For example, a spacer element may be positioned between the substrate tails during an injection molding process to form the compliant layer. The substrate tails are produced when the spacer element is removed. In another embodiment, portions of various layers can be cut out of the sensor structure to produce the first and second substrate tails.

Conductive structures may then be attached to the ends of the substrate tails (block 404). The interposer flexible circuit 310 in FIG. 3 is one example of a conductive structure. As described earlier, a conductive structure operably connects the sensor to another circuit or component in an electronic device, such as a processing device (not shown). As one example, the substrate tails (e.g., flexible circuit tails) can be connected to an interposer flexible circuit using surface-mount technology.

An adhesive layer can then be formed over a surface of the sensor structure, followed by the removal of portions of the sensor structure and adhesive layer (blocks 406 and 408). Removal of the portions of the sensor structure and adhesive layer produces an opening in each sensor (e.g., opening 302 in FIG. 3). In one example, the adhesive layer can be laminated to the surface of the sensor structure, and the inner area of each sensor can be cut out of the sensor structure. In one embodiment, the adhesive layer can be a pressure sensitive adhesive. The adhesive layer aligns with each sensor in the sensor structure when the adhesive layer is formed over the sensor structure before the inner area of each sensor is removed.

Figure 6:
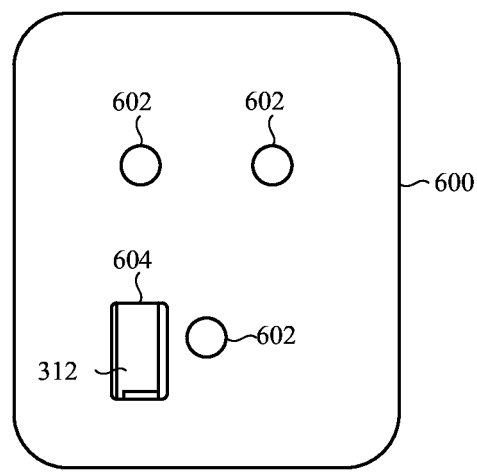
FIG. 6 shows a plan view of a bottom surface of a liner that is attached to a sensor.

Next, as shown in block 410, a liner layer may be attached to the sensor structure. The liner layer includes a liner for each sensor in the sensor structure. The liner can be used to position the sensor and the sensor module in an electronic device. In one embodiment, the liner layer can be laminated to the sensor. FIG. 6 shows a plan view of a top surface of a liner that is attached to a sensor. The sensor is not visible in FIG. 6 because the sensor is below the liner 600. The liner 600 can include one or more optional alignment openings 602 that assist in aligning the sensor properly within the electronic device. For example, in the embodiment shown in FIG. 2, the sensor is positioned on the ledge 202. The one or more optional alignment openings 602 can ensure the sensor is positioned properly on the ledge.

The liner 600 may also include an opening 604 that aligns with the connector 312 in FIG. 3. The opening 604 provides access to the connector 312 to operably connect the sensor to another circuit or component in the electronic device, such as a processing device (not shown).

Returning to block 412 in FIG. 4, the sensor structure is then cut or singulated to form discrete sensor modules (e.g., sensor module 300 in FIG. 3). Each discrete sensor module can then be positioned in an electronic device and/or connected to other structural elements or components.

The sensor structure can be formed or manufactured using one of a variety of techniques. The methods shown in FIGS. 7-14 that may be used to form a sensor structure are described as including the first and second substrate layers and the patterned compliant layer. However, other embodiments can include additional, fewer, or different layers adjacent to (over or under) a patterned compliant layer.

Figure 7:
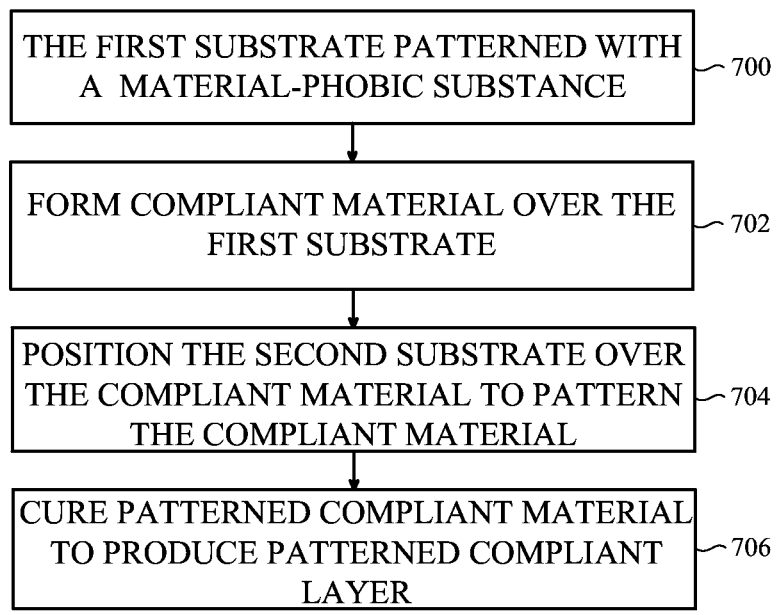
FIG. 7 shows a first method for forming a sensor structure.
Figure 8A:
FIGS. 8A-8C illustrate the method shown in FIG. 7.
Figure 8B:
Figure 8C:
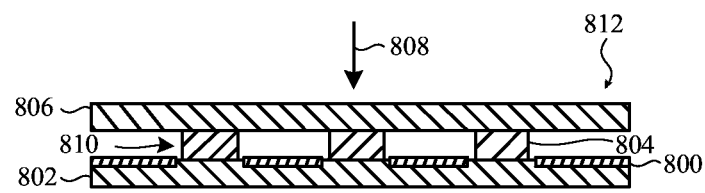

FIG. 7 shows a first method for forming a sensor structure. FIGS. 8A-8C illustrate the method shown in FIG. 7. For simplicity and clarity, the first and second sets of electrodes are omitted from FIGS. 8A-8C. Initially, as shown in block 700, a surface of the first substrate layer is patterned with a compliant material-phobic substance. As one example, when the compliant material is formed with silicone, the compliant material-phobic substance may be a polymer having a medium to low surface energy. This process is shown in FIG. 8A. In one embodiment, the compliant material-phobic substance 800 can be formed over the surface of the first substrate layer 802 at locations that correspond to the locations of the electrode(s) in the first set of electrodes (e.g., 206 in FIG. 2). In other embodiments, the compliant material-phobic substance 800 can be formed over the surface of the first substrate layer 802 at locations that overlap with or are in between the locations of the electrode(s) in the first set of electrodes. Any given pattern can be formed by the compliant material-phobic substance.

Next, as shown in block 702, the compliant material can be formed over the first substrate layer and the compliant material-phobic substance. Any suitable compliant material 804 can be used (FIG. 8B). For example, in one embodiment, the compliant material is a liquid silicone. In block 704, the second substrate 806 may then be positioned over the compliant material 804 and pressed downward (see arrow 808 in FIG. 8C). Based on the downward force, the compliant material 804 will move or flow away from the compliant material-phobic substance 800 and reside over the areas that do not include the compliant material-phobic substance 800. The compliant material 804 can then be cured (e.g., thermal curing) to set or harden the compliant material 804 to produce a patterned compliant layer 810. The completed sensor structure 812 is shown in FIG. 8C.

Figure 9:
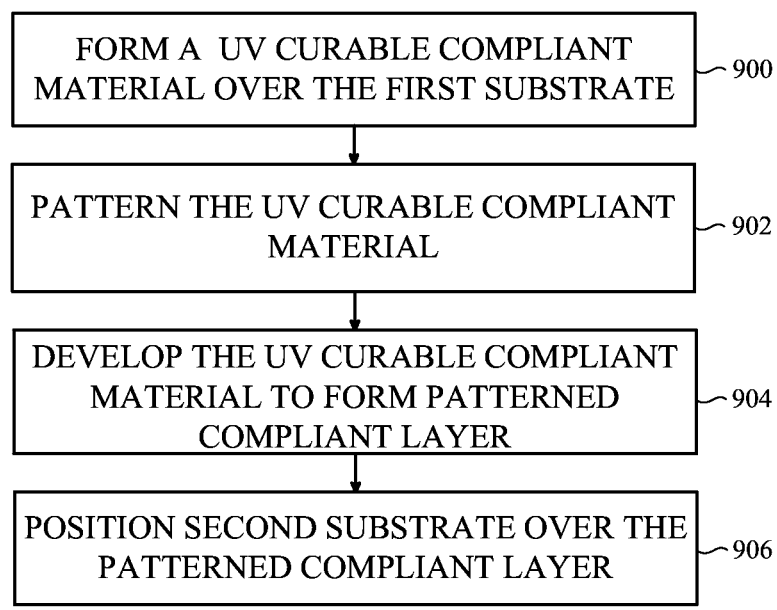
FIG. 9 shows a second method for forming a sensor structure.
Figure 10A:
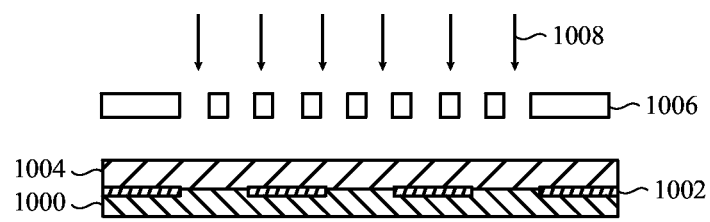
FIGS. 10A-10C illustrate the second method shown in FIG. 9.
Figure 10B:
Figure 10C:
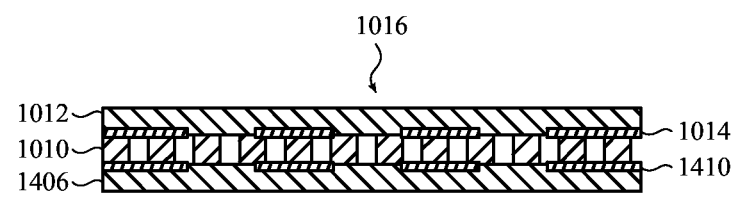

FIG. 9 shows a second method for forming a sensor structure. FIGS. 10A-10C illustrate the method shown in FIG. 9. Initially, as shown in block 900, an ultraviolet (UV) curable compliant material is formed over a surface of the first substrate. As shown in FIG. 10A, the first substrate 1000 includes a first set of electrodes 1002. Any suitable UV curable compliant material 1004 may be used. For example, in one embodiment a UV curable silicone material is formed over the first substrate 1000.

Next, as shown in block 902, the UV curable compliant material is patterned. Any suitable process may be used to pattern the UV curable compliant material. In one non-limiting example shown in FIG. 10A, a mask 1006 is positioned over the UV curable compliant material 1004 and electromagnetic radiation 1008 is emitted towards the UV curable compliant material 1004. Openings in the mask 1006 permit some of the electromagnetic radiation to pass and strike portions of the compliant material 1004, which cures or hardens the portions of the compliant material 1004. Any suitable electromagnetic radiation may be used based on the UV curable compliant material 1004. For example, the electromagnetic radiation can be light or an electron beam. Additionally, the openings in the mask may be arranged in any given pattern.

The UV curable compliant material is then developed at block 904 to remove the non-cured UV compliant material. For example, the non-cured UV curable compliant material may be removed with heat (e.g., evaporated). As shown in FIG. 10B, a patterned compliant layer 1010 is produced after the UV curable compliant material is developed. The second substrate layer can then be positioned over the patterned compliant layer (block 906). As shown in FIG. 10C, the second substrate layer 1012 includes the second set of electrodes 1014. The completed sensor structure 1016 is shown in FIG. 10C.

Figure 11:
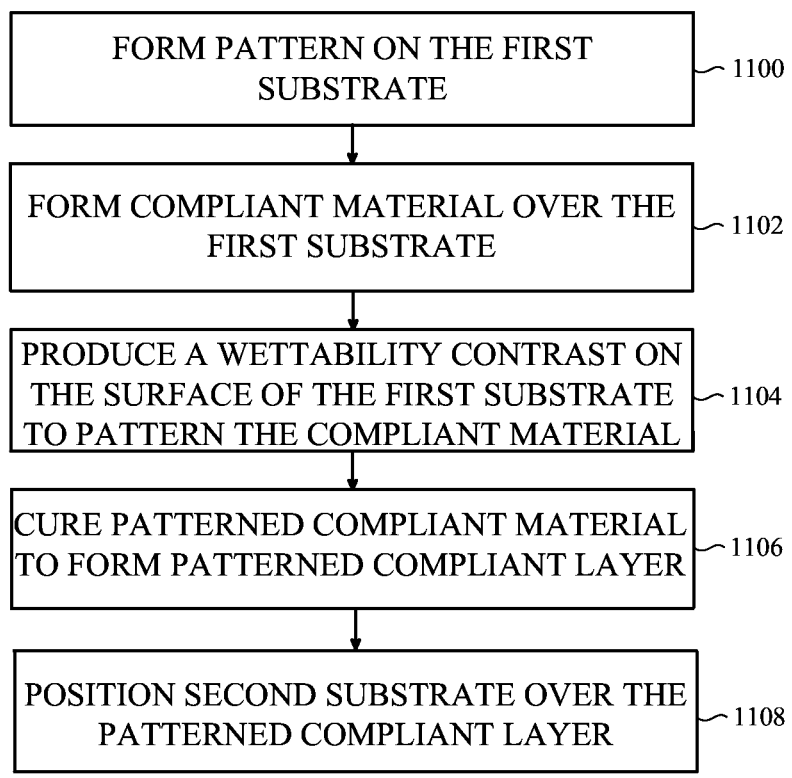
FIG. 11 shows a third method for forming a sensor structure.

FIG. 11 shows a third method for forming a sensor structure. Initially, as shown in block 1100 a surface of the first substrate layer is patterned with one or more discrete electro-active elements. Any given pattern can be formed by the electro-active elements. In one embodiment, the one or more electrodes (or at least the top surface of each electrode) in the first set of electrodes may be formed with an electro-active element. In another embodiment, an electro-active element can be disposed over a top surface of the one or more electrodes in the first set of electrodes.

A compliant material can then be formed over the surface of the first substrate (block 1102). Any suitable compliant material may be used. As one example, the compliant material is a liquid silicone in one embodiment.

Figure 12:
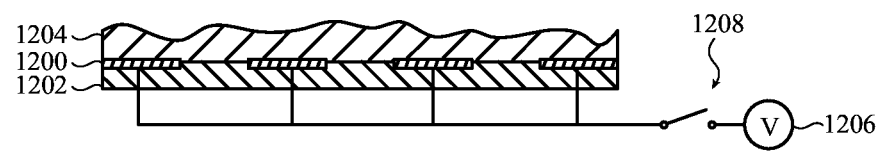
FIG. 12 shows one technique for shaping the compliant material.
Figure 13:
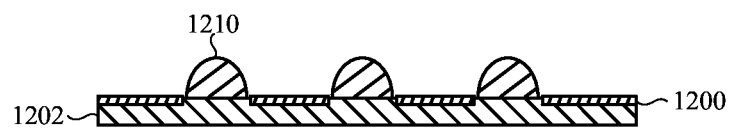
FIG. 13 shows one example of a patterned compliant layer.

Next, as shown in block 1104, the patterned compliant material is formed by shaping the compliant material based on a signal applied to the electro-active element(s). FIG. 12 depicts one technique for shaping the compliant material. As described earlier, the electro-active elements 1200 are arranged in a pattern on the first substrate 1202. The compliant material 1204 is disposed over the electro-active elements 1200 and the first substrate 1202. A signal (e.g., a voltage) 1206 may be applied to the electro-active elements by closing the switch 1208. When the signal 1206 is applied to the electro-active elements 1200, a wettability contrast is created on the surface of the first substrate 1202 by altering the electric potential built up on the surface of the electro-active elements 1200. In one embodiment, the compliant material dewets from the electro-active elements 1200 based on the applied signal. The compliant material 1204 moves away from the electro-active elements 1200 and forms droplets 1210 over the surface areas that do not include the electro-active elements 1200. This is shown in FIG. 13.

Figure 14:
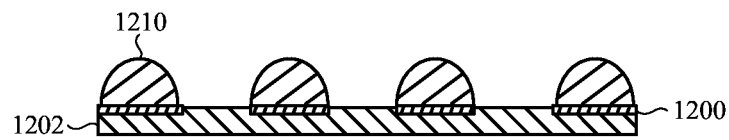
FIG. 14 shows another example of a patterned compliant layer.

In another embodiment, the compliant material 1204 wets to the electro-active elements 1200 based on the applied signal. The compliant material 1204 moves toward the electro-active elements 1200 and form droplets 1210 over the surface areas that include the electro-active elements 1200. This is shown in FIG. 14.

Returning to FIG. 11, the patterned compliant material or droplets can then be cured (e.g., thermal curing) to set or harden the compliant material and produce the patterned compliant layer. The second substrate may then be positioned over the patterned compliant layer at block 1106.

The methods shown in FIGS. 7, 9, and 11 can be used to produce a continuous sensor structure as shown in FIG. 5. In such embodiments, one or more of the processes associated with blocks 404, 406, 408, 410, and/or 412 in FIG. 4 may then be performed on the sensor structure.

The foregoing description, for purposes of explanation, used specific nomenclature to provide a thorough understanding of the described embodiments. However, it will be apparent to one skilled in the art that the specific details are not required in order to practice the described embodiments.

Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method of producing a sensor, comprising:
disposing a compliant material over a surface of a first substrate layer, wherein the surface includes one or more compliant material-phobic elements arranged in a pattern; and
positioning a second substrate layer over the compliant material to wet the compliant material to areas on the surface of the first substrate layer that do not include the compliant material-phobic elements and produce a patterned compliant layer between the first and second substrate layers.

2. The method of claim 1, wherein the compliant material comprises a liquid silicone.

3. The method of claim 2, wherein the first and second substrate layers each comprise a flexible printed circuit.

4. The method of claim 3, wherein the first substrate layer includes one or more conductive electrodes that form a first set of conductive electrodes and the second substrate layer includes one or more conductive electrodes that form a second set of conductive electrodes and each conductive electrode in the second set of electrodes is paired with a respective conductive electrode in the first set of electrodes to produce a capacitor.

5. The method of claim 1, further comprising curing the compliant material.

6. A method of producing a sensor, comprising:
disposing a compliant material over a surface of a first substrate layer, wherein the surface of the first substrate layer includes one or more discrete electro-active elements;
applying a signal to the one or more electro-active elements to produce a wettability contrast on the surface of the first substrate and pattern the compliant material;
curing the patterned compliant material to produce a patterned compliant layer; and
positioning a second substrate layer over the patterned compliant layer.

7. The method of claim 6, wherein the first and second substrate layers each comprise a flexible printed circuit.

8. The method of claim 7, wherein the first substrate layer includes one or more conductive electrodes that form a first set of conductive electrode and the second substrate layer includes one or more conductive electrodes that form a second set of conductive electrodes and each conductive electrode in the second set of electrodes is paired with a respective conductive electrode in the first set of electrodes to produce a capacitor.

9. The method of claim 6, wherein applying the signal to the one or more electro-active elements to produce a wettability contrast on the surface of the first substrate causes the compliant material to dewet from a surface of the one or more electro-active elements.

10. The method of claim 6, wherein applying the signal to the one or more electro-active elements to produce a wettability contrast on the surface of the first substrate causes the compliant material to wet to a surface of the one or more electro-active elements.

11. The method of claim 6, wherein the compliant material comprises a liquid silicone.

12. A method of producing a capacitive sensor, comprising:
disposing an ultraviolet (UV) curable compliant material over a surface of a first substrate layer, wherein the first substrate layer includes one or more conductive electrodes that form a first set of conductive electrodes;
forming a pattern in the UV curable compliant material to produce a patterned compliant layer; and
positioning a second substrate layer over the patterned compliant layer, wherein the second substrate layer includes one or more conductive electrodes that form a second set of electrodes and each conductive electrode in the second set of electrodes is paired with a respective conductive electrode in the first set of electrodes to produce a capacitor.

13. The method of claim 12, wherein the compliant material comprises a liquid silicone.

14. The method of claim 12, wherein the first and second substrate layers each comprise a flexible printed circuit.

15. The method of claim 12, wherein forming a pattern in the UV curable compliant material comprises:
positioning a mask over the UV curable compliant material, wherein the mask includes one or more openings arranged in a pattern;
curing the UV curable compliant material by emitting a UV light towards the mask; and
removing non-cured portions of the cured UV curable compliant material.

* * * * *